(12) United States Patent
Turnbull

(10) Patent No.: US 9,596,072 B2
(45) Date of Patent: Mar. 14, 2017

(54) METHOD AND APPARATUS FOR MITIGATION OF PACKET DELAY VARIATION

(71) Applicant: ADVA Optical Networking SE, Meiningen OT Dreissigacker (DE)

(72) Inventor: Peter Turnbull, Knaresborough (GB)

(73) Assignee: ADVA OPTICAL NETWORKING SE, Meiningen OT Dressigacker (DE)

( * ) Notice: Subject to any disclaimer, the term of this patent is extended or adjusted under 35 U.S.C. 154(b) by 133 days.

(21) Appl. No.: 14/562,062

(22) Filed: Dec. 5, 2014

(65) Prior Publication Data

US 2015/0163048 A1    Jun. 11, 2015

(30) Foreign Application Priority Data

Dec. 6, 2013  (EP) ...................... 13196120

(51) Int. Cl.
*H04L 7/00* (2006.01)
*H04L 12/841* (2013.01)
(Continued)

(52) U.S. Cl.
CPC .......... *H04L 7/0037* (2013.01); *H04J 3/0664* (2013.01); *H04J 3/16* (2013.01); *H04L 43/0858* (2013.01); *H04L 47/283* (2013.01)

(58) Field of Classification Search
CPC . H04L 7/0037; H04L 43/0858; H04L 47/283; H04J 3/0664; H04J 3/16
See application file for complete search history.

(56) References Cited

U.S. PATENT DOCUMENTS 6,370,125 B1  4/2002 Belk
7,817,673 B2 * 10/2010 Scott ..................... H04J 3/0632
                                              370/503
(Continued)

FOREIGN PATENT DOCUMENTS

EP     1 143 671     10/2001
WO   WO 00/48421     8/2000

OTHER PUBLICATIONS

European Search Report for Application No. 1319 6120 dated Feb. 2, 2014.

*Primary Examiner* — Jay P Patel
(74) *Attorney, Agent, or Firm* — Jenkins, Wilson, Taylor & Hunt, P.A.

(57) ABSTRACT

An apparatus for mitigation of packet delay variation, PDV, in a packet-based network, comprising an ingress port to receive event messages, each message being timestamped with a local ingress timestamp at the instant of reception of the message using a local internal clock; an extraction unit to extract a timestamp embedded in the received message; a computation unit to calculate a time offset between the extracted embedded timestamp and the local ingress timestamp of the received event message to record the calculated time offset as a maximum observed delay, if the calculated time offset exceeds a previously recorded maximum observed delay, the computation unit adjusting an internal transmission delay time before onward transmission of the event message from an egress port depending on a time difference between recorded maximum observed delay and calculated time offset of the event message to minimize the packet delay variation, PDV, at the egress port.

14 Claims, 2 Drawing Sheets

(51) Int. Cl.
    *H04J 3/16*      (2006.01)
    *H04L 12/26*     (2006.01)
    *H04J 3/06*      (2006.01)

(56) References Cited

U.S. PATENT DOCUMENTS

| | | |
|---|---|---|
| 7,835,280 B2 | 11/2010 | Pang et al. |
| 2005/0232309 A1 | 10/2005 | Kavaler |
| 2006/0187957 A1* | 8/2006 | Devine ............... H04L 12/6418 |
| | | 370/466 |
| 2009/0228732 A1* | 9/2009 | Budde .................... H04B 7/269 |
| | | 713/400 |
| 2014/0064303 A1* | 3/2014 | Aweya .................. H04J 3/0667 |
| | | 370/509 |
| 2014/0068315 A1* | 3/2014 | Aweya ...................... G06F 1/04 |
| | | 713/503 |
| 2015/0092793 A1* | 4/2015 | Aweya ................. H04J 3/0667 |
| | | 370/503 |

* cited by examiner

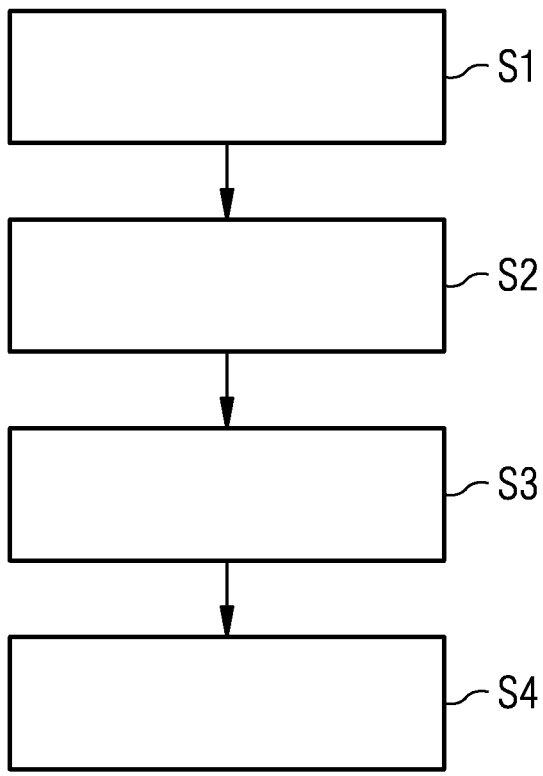

METHOD AND APPARATUS FOR MITIGATION OF PACKET DELAY VARIATION

CROSS-REFERENCE TO RELATED APPLICATION

This application claims the benefit of and priority to European Patent Application No. 13 196 120.3, filed Dec. 6, 2013, the entire disclosure of which is incorporated by reference herein.

TECHNICAL FIELD

The disclosure relates to a method and apparatus for mitigation of packet delay variation (PDV) in a packet-based network and in particular to an apparatus and method for mitigation of packet delay variation in packet-based synchronization networks.

BACKGROUND

Conventional packet-based synchronization methods such as NTP or PTP (IEEE1588) while insensitive to static delay are sensitive to packet delay variation. Packet delay variation degrades the quality of any clock signal recovered from a packet stream within the network. Conventional approaches to the mitigation of this effect require that every node in the network is protocol aware, and thus in some cases actively modify the synchronization packet stream, e.g. the PTP transparent clocks.

Segmentation of the synchronization network, e.g. IEEE1588 boundary clocks for providing residency time correction as in IEEE1588 transparent clocks can require that every device or node in the synchronization path forms an active participant in the timing protocol. An alternative conventional approach is to provide that every device in the path for the synchronization stream does have a fixed delay. This is typically but not always achieved by minimizing the delay in each device using traffic management techniques. Further, some conventional dynamic buffer allocation techniques have been proposed for specific applications relating to voice transport or circuit emulation services. However, these conventional dynamic buffer allocation techniques depend on the rate of transmission of packets of interest being constant and do not employ timestamps.

Accordingly, there is a need for a method and apparatus for mitigation of packet delay variation in a packet-based network which overcome the above-mentioned drawbacks and which can minimize a packet delay variation within the network.

SUMMARY

According to a first aspect of the present disclosure, a method for mitigation of packet delay variation in a packet-based network is provided, wherein the method comprises:

receiving event messages at an ingress port of a network device and timestamp each received event message with a local ingress timestamp at the instant of reception of the event message using a local internal clock of the network device;

extracting a timestamp embedded in the received event message and calculating a time offset between the extracted embedded timestamp and the local ingress timestamp of the received event message;

recording the calculated time offset as a maximum observed delay, if the calculated time offset exceeds a previously recorded maximum observed delay; and adjusting an internal transmission delay time before onward transmission of the event message from an egress port of the network device depending on a time difference between the recorded maximum observed delay and the calculated time offset of the event message to minimize the packet delay variation, PDV, at the egress port of the network device.

In a possible embodiment of the method according to the first aspect of the present disclosure, the event message is formed by a synchronization event message generated by a master clock device of the packet-based network.

In a further possible embodiment of the method according to the first aspect of the present disclosure, the timestamp embedded in the received event message is generated by the master clock device and indicates the origin time of the event message.

In a further possible embodiment of the method according to the first aspect of the present disclosure, the event message is formed by a protocol event message of a transport protocol of the packet-based network.

In a further possible alternative embodiment of the method according to the first aspect of the present disclosure, the event message is carried as payload data in a data packet of the packet-based network.

In a further possible embodiment of the method according to the first aspect of the present disclosure, each data packet received at the ingress port of the network device is automatically timestamped with the local ingress timestamp and the received timestamped data packet is examined to decide whether it is a protocol event message or carries an event message as payload data.

In a further possible embodiment of the method according to the first aspect of the present disclosure, if the received timestamped data packet is found to be neither a protocol event message nor to carry an event message as payload data, the local ingress timestamp of the timestamped data packet is discarded and the received data packet is loaded into a data buffer of the network device to be forwarded via the egress port of the network device.

In a still further possible embodiment of the method according to the first aspect of the present disclosure, if the received timestamped data packet is found to be a protocol event message or to carry an event message as payload data, the event message is loaded into an event message buffer of the network device to be forwarded via the egress port of the network device.

In a still further possible embodiment of the method according to the first aspect of the present disclosure, the calculation of the time offset between the extracted embedded timestamp and the local ingress time stamp of the received event message is performed by a computation unit which records the calculated time offset as a maximum observed delay, if the calculated time offset exceeds a previously recorded maximum observed delay.

In a still further possible embodiment of the method according to the first aspect of the present disclosure, the computation unit of the network device receives a preset starting value of the time offset via a communication port of the network device.

Accordingly, the disclosure provides according to a second aspect an apparatus for mitigation of packet delay variation in a packet-based network, wherein the apparatus comprises:

an ingress port adapted to receive event messages, wherein each received event message is timestamped with a local ingress timestamp at the instant of reception of the event message using a local internal clock, an extraction unit adapted to extract a timestamp embedded in the received event message, a computation unit adapted to calculate a time offset between the extracted embedded timestamp and the local ingress timestamp of the received event message to record the calculated time offset as a maximum observed delay, if the calculated time offset exceeds a previously recorded maximum observed delay, wherein the computation unit adjusts an internal transmission delay time before onward transmission of the event message from an egress port depending on a time difference between the recorded maximum observed delay and the calculated time offset of the event message to minimize the packet delay variation at the egress port.

In a still further possible embodiment of the apparatus according to the second aspect of the present disclosure, the apparatus comprises a local clock generation circuit providing a local internal clock of the apparatus to generate the local ingress timestamps.

In a still further possible embodiment of the apparatus according to the second aspect of the present disclosure, the local internal clock provided by the local clock generation circuit is synchronized, syntonized or corrected by rate estimation of the master clock device rate.

In a still further possible embodiment of the apparatus according to the second aspect of the present disclosure, the apparatus comprises an egress transmit buffer memory adapted to buffer the timestamped event messages and to output the event messages to the egress port according to the internal transmission delay time provided by the computation unit.

In a still further possible embodiment of the apparatus according to the second aspect of the present disclosure, the apparatus is integrated in a router network device.

In a still further possible embodiment of the apparatus according to the second aspect of the present disclosure, the apparatus is integrated in a bridge network device of the packet-based network.

In a still further possible embodiment of the apparatus according to the second aspect of the present disclosure, the apparatus is a demarcation apparatus located at the edge of a packet-based network of a transport service provider.

The disclosure further provides according to a third aspect a packet-based network comprising at least one apparatus according to the second aspect of the present disclosure.

BRIEF DESCRIPTION OF THE DRAWINGS

In the following, possible embodiments of the method and apparatus according to different aspects of the present disclosure are described with reference to the enclosed figures in more detail.

FIG. 2 shows a flowchart for illustrating a possible embodiment of a method for mitigation of packet delay variation in a packet-based network according to a further aspect of the present disclosure.

DETAILED DESCRIPTION

Figure 1:
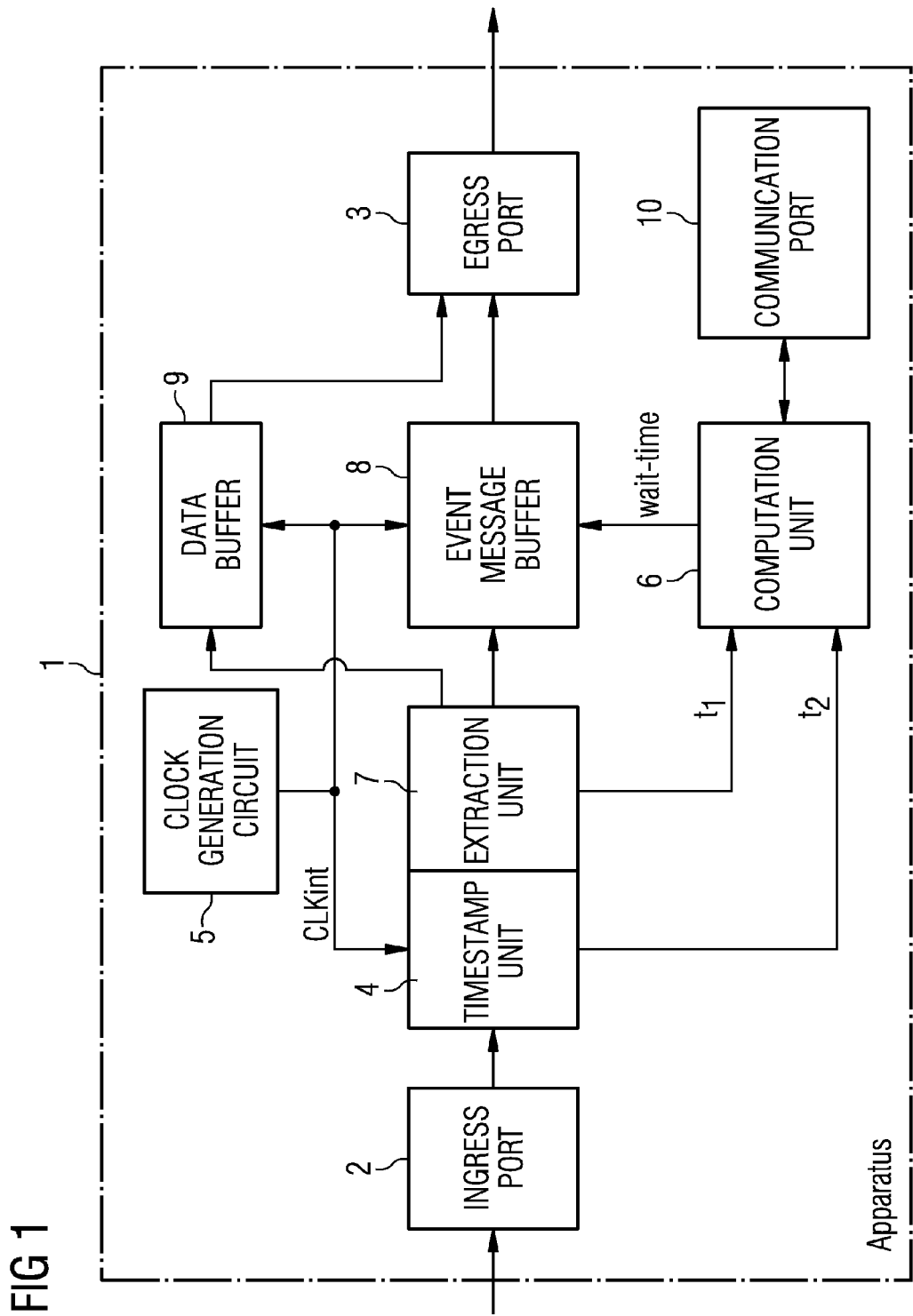
FIG. 1 shows a block diagram of a possible embodiment of an apparatus for mitigation of packet delay variation according to an aspect of the present disclosure.

As can be seen in FIG. 1, an apparatus 1 for mitigation of packet delay variation, PDV, in a packet-based network can comprise in the shown embodiment at least one ingress port 2 and at least one egress port 3. The apparatus 1 as shown in FIG. 1 can in a possible embodiment be integrated in a router network device or a bridge network device of the packet-based network. Further, the apparatus 1 can form a demarcation apparatus located at the edge of a packet-based network of a transport service provider. The number of ingress ports 2 and egress ports 3 of the apparatus 1 can vary.

The ingress port 2 of the apparatus 1 is adapted to receive messages, in particular event messages from other network devices within the network. Each received event message is timestamped with a local ingress timestamp at the instant of reception of the event message using a local internal clock of the network device comprising the apparatus 1 as shown in FIG. 1. In the embodiment illustrated in FIG. 1, the received event message is timestamped by a timestamp unit 4 using a local internal clock, $CLK_{int}$, generated by a local clock generation circuit 5. The local clock generation circuit 5 provides the local internal clock $CLK_{int}$ of the network device, wherein the local internal clock can be used by the timestamp unit 4 to generate local ingress timestamps TS. The generated local ingress timestamps TS are used to timestamp the received event messages. The local ingress timestamps TS used by the timestamp unit 4 to timestamp the received event messages are supplied also to a computation unit 6 of the apparatus 1 as illustrated in FIG. 1. The apparatus 1 further comprises an extraction unit 7 adapted to extract a timestamp $t_1$ embedded in the received event message. This extracted timestamp $t_1$ is also provided to the computation unit 6 as illustrated in FIG. 1. The computation unit 6 is adapted to calculate a time offset ($t_{diff}$) between the extracted embedded timestamp $t_1$ received from the extraction unit 7 and the local ingress timestamp $t_2$ of the received event message received from the timestamp unit 4 $t_{diff}=t_2-t_1$.

The computation unit 6 computes the time offset between the extracted embedded timestamp $t_1$ and the local ingress timestamp $t_2$ of the received event message to record the calculated time offset $t_{diff}$ as the maximum observed delay $t_{diffmax}$, if the calculated time offset $t_{diff}$ exceeds a previously recorded maximum observed delay. In a possible embodiment, the maximum observed delay $t_{diffmax}$ can be temporarily stored in a local memory of the computation unit 6. The computation unit 6 is further adapted to adjust an internal transmission delay time before onward transmission of the event message from the egress port 3 of the network device depending on a time difference between the recorded maximum observed delay $t_{diffmax}$ and the calculated time offset $t_{diff}$ of the respective event message to minimize the packet delay variation, PDV, at the egress port 3 of the network device.

As shown in FIG. 1, the apparatus 1 comprises in the illustrated embodiment an egress transmit buffer memory 8. The egress transmit buffer memory 8 is adapted to buffer the timestamped event messages and to output the event messages to the egress port 3 of the apparatus 1 according to the internal transmission delay time (wait time) provided by the computation unit 6 of the apparatus 1.

Wait time=$t_{diffmax}-t_{diff}$

The event message received at the ingress port 2 of the apparatus 1 can be formed by a synchronization event message generated by a master clock device of the packet-based network. The timestamp $t_1$ embedded in the received event message can be generated by this master clock device and can indicate in a possible embodiment the origin time of the respective event message.

In a possible embodiment, the event message received at the ingress ports 2 of the apparatus 1 can be formed by a protocol event message of a transport protocol of the packet-based network. In a still further alternative embodiment, the event message can also be carried as payload data in a data packet of the packet-based network.

Each data packet received at the ingress port 2 of the apparatus or network device 1 is automatically timestamped as a timestamp unit 4 of the apparatus 1 with the local ingress timestamp using the local internal clock provided by the clock generation circuit 5 and each received time-stamped data packet is then examined to decide whether it is a protocol event message or does carry an event message as payload data.

If the received timestamped data packet is found to be neither a protocol event message nor to carry an event message as payload data, in a possible embodiment, the local ingress timestamp of the timestamped data packet is discarded and the received data packet is loaded into a data buffer 9 of the apparatus 1 to be forwarded via the egress port 3 of the network device. In contrast, if the received timestamped data packet is found to be a protocol event message or to carry an event message as payload data, the event message is loaded into the event message buffer 8 of the apparatus 1 to be forwarded via the egress port 3 of the network device.

By inspection of the timestamps TS embedded in the received event messages, in particular synchronization event messages, on arrival at the network device and by comparing them to the internal time of the network device at the instant of arrival of the data packet in question, a value for the ceiling delay, i.e. the maximum observed delay of the event messages from the source to the ingress port 2 can be obtained. This value is used to dynamically adjust the internal delay before onward transmission of the respective event messages with a lower observed delay such that the variation in overall delay seen at the egress port 3 of the network device is minimized. Accordingly, with the method and apparatus 1 according to the present disclosure no attempt is made to minimize the absolute delay but the packet delay variation, PDV, is minimized or mitigated.

In a possible embodiment, a maximum delay can be preconfigured to a user defined value. In a possible embodiment, the computation unit 6 of the network device receives a preset starting value of the time offset via a communication port 10 of the apparatus 1 as illustrated in FIG. 1.

In a further possible embodiment, the total delay to be maintained is not immediately set to a new observed maximum, but can increment the target delay in response to new maximum observed delays. The simple peak detection and hold of network delay is computationally less complex than relying on the calculation of mean delays and distribution metrics for the packet stream.

Accordingly, the apparatus 1 according to the present disclosure as illustrated in FIG. 1 provides an adapted delay based on a ceiling delay. In a possible embodiment, ingress synchronization event messages are timestamped using a local internal clock of the network device. Then, an offset between an embedded timestamp of the received synchronization event message and an ingress timestamp is calculated. From the calculated offset a delay value is inferred and a maximum observed value is recorded and maintained. If the calculated offset indicates that the delay for the current packet is less than the maximum observed delay, the respective packet is delayed by a difference between the maximum and current delay plus eventually a device latency. The resulting delay from the source observed at the egress port 3 is maintained constant. If the calculated offset indicates that the current packet delay is higher than the stored maximum, the respective packet is forwarded as soon as possible and the maximum delay is updated.

FIG. 2 shows a flowchart of a possible embodiment of the method according to an aspect of the present disclosure.

In a first step S1, event messages are received at the ingress port 2 of the apparatus or network device 1 and each received event message is timestamped with a local ingress timestamp $t_2$ at the instant of reception of the event message using a local internal clock of the apparatus 1. This local internal clock can be generated in a possible embodiment by a local clock generation circuit of the apparatus 1.

In a further step S2, a timestamp $t_1$ embedded in the received event message is extracted and a time offset $t_{diff}$ is calculated between the extracted embedded timestamp $t_1$ and the local ingress timestamp $t_2$ of the received event message.

In a further step S3, the calculated time offset $t_{diff}$ is recorded as a maximum observed delay, if the calculated time offset exceeds a previously recorded maximum offset delay.

Finally, in a step S4, an internal transmission delay time before onward transmission of the event message from an egress port 3 of the network device is adjusted depending on a time difference between the recorded maximum observed delay $t_{diffmax}$ and the calculated time offset $t_{diff}$ of the event message to minimize the packet delay variation, PDV, at the egress port 3 of the network device.

With the method and apparatus according to the present disclosure, unlike conventional approaches no modification or participation in the time transport protocol is required. With the method and apparatus according to the present disclosure, the only requirement is that embedded timestamps in the protocol event messages are accessible. With the method according to the present disclosure, the packet delay variation, PDV, seen at the egress port 3 of the network device is reduced and minimized without the need for a full on path support or other PDV minimization strategies in other upstream network devices. Accordingly, the method of the present disclosure is easy to implement without additional complex circuitry and provides a robust and resilient as well as reliable mitigation or minimization of packet delay variation, PDV, within the packet-based network. By reducing the packet delay variation, PDV, a degradation of the recovered clock quality can be avoided. Further, by reducing the packet delay variation, PDV, the computational load in slave devices can be diminished. With the method and apparatus according to the present disclosure, the performance of the recovered clock signal can be increased and possible jitter is reduced.

The invention claimed is:

1. A method for mitigation of packet delay variation, PDV, in a packet-based network, the method comprising:
   receiving event messages at an ingress port of a network device and timestamp each received event message with a local ingress timestamp at the instant of reception of the event message using a local internal clock of the network device;
   extracting a timestamp embedded in the received event message and calculating a time offset between the extracted embedded timestamp and the local ingress timestamp of the received event message;
   recording the calculated time offset as a maximum observed delay, if the calculated time offset exceeds a previously recorded maximum observed delay; and adjusting an internal transmission delay time before onward transmission of the event message from an egress port of the network device depending on a time difference between the recorded maximum observed delay and the calculated time offset of the event message to minimize the packet delay variation, PDV, at the egress port of the network device, wherein each data packet received at the ingress port of the network device is automatically timestamped with the local ingress timestamp and the received timestamped data packet is examined to decide whether the received timestamped data packet is a protocol event message or carries an event message as payload data.

2. The method according to claim 1, wherein the event message is formed by a synchronization event message generated by a master clock device of the packet-based network.

3. The method according to claim 2, wherein the timestamp embedded in the received event message is generated by the master clock device and indicates the origin time of the event message.

4. The method according to claim 1, wherein the event message is formed by a protocol event message of a transport protocol of the packet-based network or is carried as payload data in a data packet of the packet-based network.

5. The method according to claim 1, wherein if the received timestamped data packet is found to be neither a protocol event message nor to carry an event message as payload data, the local ingress timestamp of the timestamped data packet is discarded and the received data packet is loaded into a data buffer of the network device to be forwarded via the egress port of the network device.

6. The method according to claim 1, wherein if the received timestamped data packet is found to be a protocol event message or to carry an event message as payload data, the event message is loaded into an event message buffer of the network device to be forwarded via the egress port of the network device.

7. The method according to claim 1, wherein the calculation of the time offset between the extracted embedded timestamp and the local ingress time stamp of the received event message is performed by a computation unit which records the calculated time offset as a maximum observed delay, if the calculated time offset exceeds a previously recorded maximum observed delay.

8. The method according to claim 1, wherein the computation unit of the network device receives a preset starting value of the time offset via a communication port of the network device.

9. An apparatus for mitigation of packet delay variation, PDV, in a packet-based network, the apparatus comprising:
an ingress port adapted to receive event messages, wherein each received event message is timestamped with a local ingress timestamp at the instant of reception of the event message using a local internal clock, wherein each data packet received at the ingress port of the network device is automatically timestamped with the local ingress timestamp and the received timestamped data packet is examined to decide whether the received timestamped data packet is a protocol event message or carries an event message as payload data;
an extraction unit adapted to extract a timestamp embedded in the received event message;
a computation unit adapted to calculate a time offset between the extracted embedded timestamp and the local ingress timestamp of the received event message to record the calculated time offset as a maximum observed delay, if the calculated time offset exceeds a previously recorded maximum observed delay, wherein the computation unit adjusts an internal transmission delay time before onward transmission of the event message from an egress port depending on a time difference between the recorded maximum observed delay and the calculated time offset of the event message to minimize the packet delay variation, PDV, at the egress port;
wherein the extraction unit and the computation unit are implemented as hardware.

10. The apparatus according to claim 9, wherein the apparatus comprises a local clock generation circuit providing the local internal clock of the apparatus to generate the local ingress timestamps, wherein the local internal clock is synchronized; syntonized or corrected by rate estimation to the master clock device rate.

11. The apparatus according to claim 9 comprising an egress transmit buffer memory adapted to buffer the timestamped event messages and to output the event messages to the egress port according to the internal transmission delay time provided by the computation unit.

12. The apparatus according to claim 9, wherein the apparatus is integrated in a router network device or a bridge network device of the packet-based network.

13. The apparatus according to claim 9, wherein the apparatus is a demarcation apparatus located at the edge of a packet-based network of a transport service provider.

14. A packet-based network comprising at least one apparatus according to claim 9.

* * * * *